United States Patent

[11] 3,610,706

[72] Inventor Frank L. Meyer
 Houston, Tex.
[21] Appl. No. 828,266
[22] Filed May 27, 1969
[45] Patented Oct. 5, 1971
[73] Assignee Shell Oil Company
 New York, N.Y.

[54] METHOD FOR PREVENTING SLUMPING OF A SETTLED BED IN INCLINED PIPES
 1 Claim, 4 Drawing Figs.
[52] U.S. Cl. ................................................. 302/66,
 302/14
[51] Int. Cl. ........................................................ B65g 53/04
[50] Field of Search .......................................... 302/14, 64,
 66

[56] References Cited
 UNITED STATES PATENTS
 630,605 8/1899 Gordon et al. ................ 302/64
 1,603,653 10/1926 Ward .......................... 302/14
 3,313,577 4/1967 Wolfe .......................... 302/64

Primary Examiner—Andres H. Nielsen
Attorneys—Thomas R. Lampe and J. H. McCarthy

ABSTRACT: Method for preventing downhill slumping in a shutdown slurry pipeline. A helical rib or spiral fin is positioned in the pipeline in those sections of the line where inclination exceeds some predetermined critical angle to prevent the formation of a line plug by the solid phase of the slurry material sliding or slumping toward locations in the pipeline that are susceptible to plugging.

PATENTED OCT 5 1971

3,610,706

INVENTOR:
F. L. MEYER
BY:
Thomas R Lampe
HIS ATTORNEY

METHOD FOR PREVENTING SLUMPING OF A SETTLED BED IN INCLINED PIPES

The present invention relates to pipeline transport operations; and more particularly, to a method for preventing the downward movement of slurry solids in an inclined portion of a pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are attempted.

These difficulties are most commonly avoided by laying solids-carrying or slurry pipelines so that they do not exceed a slope or angle of inclination below which sliding does not occur. Alternatively, the inclined pipeline sections are emptied or flushed at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical method whereby slurry material being transported in an inclined pipeline section is prevented from slumping during a line shutdown.

This and other objects have been attained in the present invention by providing a method for preventing downhill slumping in a shutdown slurry pipeline wherein a helical or spiral fin is installed in the pipeline in the sections thereof where the inclination exceeds some critical angle below which slumping does not occur. The rib or fin, which may protrude into the pipeline interior 0.02 to 0.4 diameters, for example, prevents the settled bed of the slurry solid phase from sliding down the inclined portion of the pipeline to form a plug.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined with the horizontal.

Figure 1:
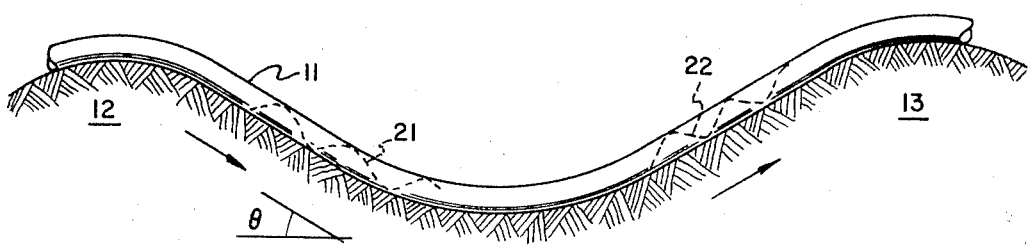
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of pumps (not shown) or by gravitation is moving through the line in the direction indicated by the arrows. However, the teachings of the present invention are, of course, applicable regardless of the direction of flow of the slurry. The pipeline may, of course, have only one inclination and thereby not contain a valley.

As long as flow continues in the pipeline, the solid matter of the slurry will remain suspended in the liquid, even when the solid matter has a higher specific gravity than the liquid. If, however, the flow is stopped for any reason, i.e., the pipeline is shut down or fails, such solid particulate matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impractical, to disperse or resuspend. In the illustrated pipeline configuration, such solids would slide downwardly into the valley formed between hills or mountains 12 and 13 or to the lower end of a singularly inclined pipe. The solid material would then compress under its own weight to form a plug in the valley or lower end in an obvious manner.

Such plug formation is prevented in accordance with the teachings of the present invention as follows.

Figure 2:
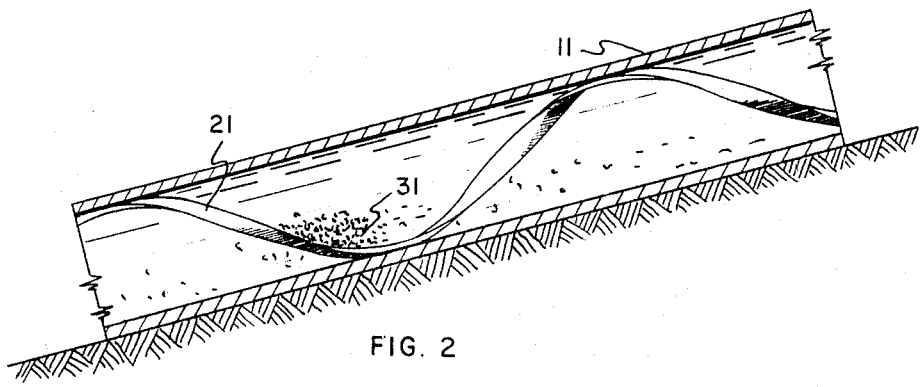
FIG. 2 is an enlarged cross-sectional view in longitudinal projection illustrating an inclined portion of the pipeline section of FIG. 1 with one form of spiral fin installed therein.

Installed within pipeline 11 at preselected locations are helical ribs or spiral fins 21 and 22. FIG. 2 illustrates the construction of one of these fins or ribs 21 in greater detail and reference may be had to that figure as well as FIG. 1 for a proper understanding of the operation of one form of fin or rib which may be utilized in carrying out the teachings of the present invention. Rib 21 is in the form of a continuous helix extending along the inner peripheral wall of pipeline 11 in abutting engagement therewith. The rib 21 extends or protrudes into the throughbore defined by pipeline 11 a predetermined distance which may be in the order of 0.02 to 0.4 pipeline diameters, for example. The rib may be secured to the pipeline 11 in any known manner, such as spot welding. Alternately, the rib 21 may be formed integrally with the pipeline as by means of extrusion or by forming a flange along one edge of the metal sheet used in constructing the pipeline and helically winding the sheet around a mandrel so that the flange forms the helical rib.

The helical fins or ribs, such as rib 21, which are utilized in carrying out the teachings of the present invention may be installed only in those portions of the pipeline which are inclined to the horizontal at an angle greater than some predetermined angle, $\theta$, at which slumping of the solid phase of the slurry material carried by pipeline 11 occurs. This angle would, of course, depend upon such factors as viscosity of the liquid, relative densities of the solid and liquid phases of the slurry, etc. By restricting the location of the ribs in this manner, the interference with slurry flow during pipeline transport would be minimized.

In the event the pipeline flow is stopped for any reason, such as repair work, inspection, etc. the solid phase of the slurry material, normally being of greater density than the liquid phase thereof, tends to settle out to form a bed on the bottom of pipeline 11. In the event such settling out occurs in the portions of the pipeline inclined to the horizontal at an angle greater than θ, the solid phase tends to slump or slide downwardly within the pipeline. If this slumping action is not prevented, a plug of solid phase slurry material may be formed in portions of the pipeline which may hamper restart of the pipeline. By installing fins or ribs similar to rib 21 in those portions of the pipeline inclined at an angle greater than θ, such slumping is prevented or minimized due to the fact that the settled bed of solid phase slurry material contacts the rib as at 31 (FIG. 2), thus preventing or minimizing further downward movement thereof within the pipeline.

Figure 3:
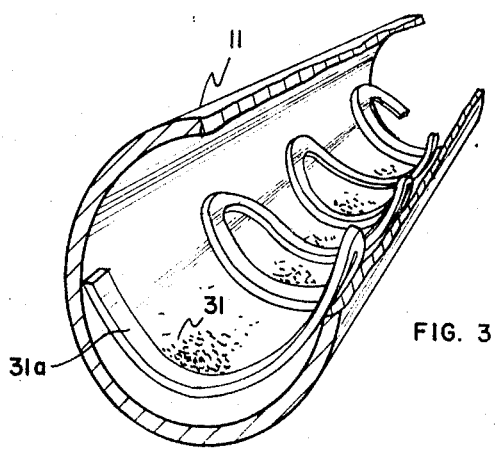
FIG. 3 is a view similar to that of FIG. 2 but illustrating an alternative form of spiral fin or rib which may be utilized in carrying out the teachings of the present invention.

Rib 21 is only representative of the types of ribs or fins which may be employed to prevent slumping of the slurry material solid phase. In FIG. 3, for example, an alternate form of rib 31a is shown positioned within pipeline 11. Rib 31a rather than extending about the entire inner peripheral surface of pipeline 11, is restricted to the bottom half of the line with the rib curving back and forth as it progresses therealong. This modification reduces resistance to slurry flow in the pipeline as compared to rib 21 since it is restricted to the bottom of the line, while at the same time preventing downward slumping of the slurry material solid phase which has settled out in a bed at the bottom of pipeline 11. Once again, rib 31a may be installed only in those portions of pipeline 11 where the angle with respect to the horizontal exceeds angle θ.

Figure 4:
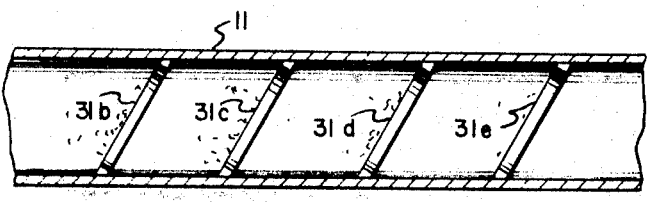
FIG. 4 is an enlarged cross-sectional plan view illustrating a portion of pipeline section incorporating still another alternative form of rib construction.

Alternatively, as shown in FIG. 4, a plurality of separate short fin segments 31b–31e may be installed only the lower portions of the pipeline 11 such that the fins will all spiral in the same direction relative to the pipe. This would eliminate eddys which could be formed with fins of the configuration of FIG. 3. The fins would not be continuous, but this would not affect their effectiveness and may provide the advantage of providing an unobstructed channel in the top of the pipeline for restart.

I claim as my invention:

1. A method for preventing downhill slumping of the solid phase of a slurry material transported by pipeline, said slurry material including a solid phase and a liquid phase, said method comprising the steps of:

installing within the pipeline at preselected locations a rib which projects inwardly into the throughbore defined by the pipeline and curves back and forth along the bottom half of the pipeline;

restricting the location of the rib to those portions of the pipeline which are inclined at an angle to the horizontal slightly less than or greater than the angle at which slumping of the slurry material solid phase will occur;

said rib projecting into the interior of the pipeline a distance sufficient to engage the slurry material and at least partially prevent it from slumping within the pipe when the transport of the slurry material within the pipeline is terminated and said material solid phase settles within said pipeline.